(12) United States Patent
Kwon et al.

(10) Patent No.: US 8,649,169 B2
(45) Date of Patent: Feb. 11, 2014

(54) SYSTEMS AND METHODS FOR SECURING MOBILE COMPUTING DEVICES

(75) Inventors: Kitae Kwon, San Jose, CA (US); Phil Baker, Solana Beach, CA (US); Andrew R. Church, Oakland, CA (US)

(73) Assignee: infiniWing, Inc., San Jose, CA (US)

( * ) Notice: Subject to any disclaimer, the term of this patent is extended or adjusted under 35 U.S.C. 154(b) by 70 days.

(21) Appl. No.: 13/302,686

(22) Filed: Nov. 22, 2011

(65) Prior Publication Data

US 2012/0127651 A1     May 24, 2012

Related U.S. Application Data

(60) Provisional application No. 61/416,403, filed on Nov. 23, 2010.

(51) Int. Cl.
*G06F 1/16* (2006.01)

(52) U.S. Cl.
USPC ............... 361/679.41; 439/638; 439/810

(58) Field of Classification Search
USPC .......... 361/679.4–679.45, 679.57; 439/540.1, 439/638, 639, 654, 810
See application file for complete search history.

(56) References Cited

U.S. PATENT DOCUMENTS

| | | | | |
|---|---|---|---|---|
| 4,996,628 A | * | 2/1991 | Harvey et al. | 361/735 |
| 5,169,114 A | * | 12/1992 | O'Neill | 248/551 |
| 5,186,646 A | | 2/1993 | Pederson | |
| 5,262,759 A | * | 11/1993 | Moriconi et al. | 361/679.29 |
| D371,769 S | * | 7/1996 | Shima et al. | D14/434 |
| 5,535,093 A | * | 7/1996 | Noguchi et al. | 361/679.43 |
| 5,580,182 A | | 12/1996 | Lin | |
| 5,595,074 A | * | 1/1997 | Munro | 70/58 |
| RE35,677 E | * | 12/1997 | O'Neill | 248/551 |
| 5,692,400 A | * | 12/1997 | Bliven et al. | 70/58 |
| 5,745,340 A | * | 4/1998 | Landau | 345/2.1 |
| 5,768,100 A | | 6/1998 | Barrus et al. | |
| 5,779,499 A | * | 7/1998 | Sette et al. | 439/540.1 |
| D396,705 S | | 8/1998 | Iino | |
| 5,805,412 A | * | 9/1998 | Yanagisawa et al. | 361/679.41 |
| D400,515 S | | 11/1998 | Shima | |
| 5,903,645 A | * | 5/1999 | Tsay | 379/455 |
| 5,928,017 A | * | 7/1999 | Lan | 439/159 |
| D413,312 S | | 8/1999 | Suzuki | |
| 6,142,593 A | * | 11/2000 | Kim et al. | 312/223.2 |
| 6,188,572 B1 | | 2/2001 | Liao et al. | |

(Continued)

OTHER PUBLICATIONS

BookEndz model Be-MBA13 Facebook product announcement dated Oct. 21, 2010 and undated manual for same found at http://www.bookendzdocks.com/be-mba13_manual.pdf.

(Continued)

*Primary Examiner* — Adrian S Wilson
(74) *Attorney, Agent, or Firm* — Peters Verny, LLP

(57) ABSTRACT

Systems for securing mobile devices such as laptops are provided. Such systems are characterized by two end members, each with a male electrical connector, that engage opposite sides of mobile device, a crossbeam between the two end members that cradles the underside of the mobile device, and a mechanical linkage that is used to release the mobile device. In addition to a slim form factor, systems of the present invention can comprise registration posts to align a top edge of the mobile device to the crossbeam, a receptacle for a power adapter connector, and a locking mechanism to lock an end member to the crossbeam and optionally also lock the power adapter connector to the system.

14 Claims, 9 Drawing Sheets

(56) References Cited

U.S. PATENT DOCUMENTS

| | | | |
|---|---|---|---|
| 6,216,195 B1* | 4/2001 | Lee et al. | 710/303 |
| 6,220,883 B1* | 4/2001 | Helot et al. | 439/341 |
| 6,407,914 B1* | 6/2002 | Helot | 361/679.41 |
| 6,585,212 B2* | 7/2003 | Carnevali | 248/346.07 |
| 6,724,623 B2* | 4/2004 | Bovio et al. | 361/679.45 |
| 6,813,145 B2* | 11/2004 | DeLuga | 361/679.41 |
| 6,839,237 B2* | 1/2005 | Berry et al. | 361/727 |
| D505,958 S | 6/2005 | Cheng | |
| 6,952,343 B2* | 10/2005 | Sato | 361/679.57 |
| 7,032,872 B2* | 4/2006 | Sullivan | 248/346.07 |
| 7,174,752 B2* | 2/2007 | Galant | 70/58 |
| 7,299,668 B1* | 11/2007 | Lu et al. | 70/58 |
| D583,820 S | 12/2008 | O'Shea | |
| 7,499,270 B2* | 3/2009 | Allen | 361/679.56 |
| 7,503,808 B1* | 3/2009 | O'Shea | 439/639 |
| 7,511,954 B2* | 3/2009 | Tsai et al. | 361/679.41 |
| 7,551,458 B2* | 6/2009 | Carnevali | 361/807 |
| D604,737 S | 11/2009 | Symons | |
| 8,074,951 B2* | 12/2011 | Carnevali | 248/313 |
| 8,105,108 B2* | 1/2012 | Vroom et al. | 439/540.1 |
| 8,176,603 B2* | 5/2012 | Carnevali | 24/523 |
| 8,199,490 B2* | 6/2012 | Wilkenfeld | 361/679.55 |
| 8,240,628 B2* | 8/2012 | Huang | 248/316.1 |
| 8,276,872 B2* | 10/2012 | Lampman et al. | 248/551 |
| 2003/0164010 A1* | 9/2003 | Galant | 70/58 |
| 2003/0227746 A1* | 12/2003 | Sato | 361/686 |
| 2005/0116685 A1* | 6/2005 | Liu et al. | 320/116 |
| 2005/0128687 A1* | 6/2005 | Liang et al. | 361/679 |
| 2005/0286218 A1* | 12/2005 | Kim | 361/686 |
| 2008/0002355 A1* | 1/2008 | Carnevali | 361/686 |
| 2008/0142662 A1* | 6/2008 | Leung | 248/346.3 |
| 2008/0165492 A1* | 7/2008 | Ward et al. | 361/686 |
| 2008/0270664 A1* | 10/2008 | Carnevali | 710/303 |
| 2009/0231793 A1* | 9/2009 | Chiu et al. | 361/679.08 |
| 2011/0065314 A1 | 3/2011 | Vroom et al. | |
| 2012/0008277 A1* | 1/2012 | Wang et al. | 361/679.57 |

OTHER PUBLICATIONS

PCT/US2011/062041 International Search Report and Written Opinion, dated Mar. 27, 2012.

U.S. Appl. No. 13/356,429, Jan. 23, 2012, Kitae Kwon, Wireless Audio/Video Transmitter using World Wide Web Standard.

U.S. Appl. No. 13/761,836, Feb. 7, 2013, Kitae Kwon, Systems and Methods for Securing Mobile Computing Devices.

* cited by examiner

SYSTEMS AND METHODS FOR SECURING MOBILE COMPUTING DEVICES

CROSS-REFERENCE TO RELATED APPLICATIONS

This application claims the benefit of U.S. Provisional Patent Application Ser. No. 61/416,403 filed on Nov. 23, 2010 and entitled "Systems and Methods for Attaching Third-Party Peripherals to Laptop Computers" which is incorporated herein by reference. This application is related to U.S. Design patent application Ser. No. 29/416,403 filed on Nov. 23, 2010 and entitled "Systems and Methods for Attaching Laptop Dock."

BACKGROUND OF THE INVENTION

1. Field of the Invention

The invention relates generally to the field of consumer electronics and more particularly to systems that engage with computing devices such as laptop computers.

2. Description of the Prior Art

Various portable computing devices, such as laptop computers, tablets, smart phones, Personal Digital Assistants (PDAs), and the like are sometimes attached to peripheral devices to provide some or all of a connection to power, a connection to further peripheral devices such as speakers, improved cooling, a means to secure the portable computing system, a means to elevate the computing system to a more ergonomic height, and a means to maintain the computing system in a particular orientation for better viewability. Such peripheral devices are commonly known in the art as "docking stations," "docking ports," or just "docks."

One example of such a dock is provided by Vroom et al., U.S. Pre-Grant Publication 2011/0065314. The dock described therein attaches along one side of a laptop computer, and can be used, for example to cradle the laptop computer in a vertical orientation, with the screen closed, minimizing the footprint of the laptop when using an external monitor rather than the laptop's own screen.

Another such example of a dock is the model BE-MBA13 from Bookendz of Elgin, Ill., illustrated by FIG. 1A. The Bookendz dock 100 includes a flat metal plate 110 with two feet 120 disposed along a front edge thereof. The plate 110 is meant to support a laptop computer at an angle, elevated toward the rear, for better typing ergonomics, and the feet 120 both prevent the laptop computer from sliding off of the plate 110 and also prevent the entire dock 100 from sliding. The plate 110 is made of metal to conduct heat away from the laptop computer which rests in contact with the plate 110. To engage the laptop computer, one first sets the laptop on the plate 110 and slides it down towards the feet 120 until the feet of the laptop computer rest within the recesses 130 in each foot 120.

The plate 110 also includes two end pieces 140 slidably connected to the top surface of the plate 110, as better illustrated by FIG. 1B, discussed below. Also attached to the plate 110 are separate housings 145, each fixedly attached to a bottom surface of the plate 110, one below each of the slidable end pieces 140. Each end piece 140 includes male electrical connectors 150 meant to mate to female electrical connectors of the laptop computer. Each housing 145 includes wiring and/or electrical components connected to the electrical connectors 150. The top surface of the plate 110 between the two end pieces 140 is flat and free of obstructions so that the screen of the laptop can be freely raised.

FIG. 1B shows an underside view of the Bookendz dock 100 with the housings 145 omitted for clarity. Each end piece 140 includes three pins 160 that are constrained to slide within parallel slots 170 in the metal plate 110. The Bookendz dock 100 also includes a mechanism 175 for releasing the laptop computer from the dock 100. The mechanism 175 comprises a lever arm 180 configured to pivot around a pin 160 fixed to the plate 110, and two links 185 each slidably connected to a circular portion of the arm 180 centered on the pin 160. One link 185 is also attached to the center pin 160 in each set of three pins 160 such that translation of the arm 180 around the pin 160 attached to the plate 110 can push each end piece 140 away from the laptop computer.

Each link 185 is slidably connected to the circular portion of the arm 180 by pins 160 constrained to move within arc-shaped grooves 190 in the circular portion of the arm 180. It will be appreciated that the effect provided by the pin-in-groove arrangement is that when the end pieces 140 are pushed inwards towards the laptop computer to engage the connectors 150 the arm 180 does not move. It can thus be seen that the arrangement also allows either end piece 140 to slide in and out within its complete range when the other end piece 140 is at the inside end of its range, in other words, the end pieces 140 are not always constrained to move together. The pin-in-groove arrangement advantageously prevents a user from employing the arm 180 to engage the connectors 150 to the laptop computer, avoiding the possibility that the user will use the lever arm 180 to force and potentially damage misaligned connectors. Rather, the user must push each end piece 140 inward by hand, making certain first of alignment. Thus, the end pieces 140, when both fully engaged, are held in place by the mechanism 175 only by the frictional fit of the male and female connectors.

Returning to FIG. 1A, the dock 100 includes, within the housing 145, a female power connector (not shown) configured to receive the male connector of a standard AC adapter. The AC adapter must be connected to the dock 100 to power the USB ports on the dock 100. The dock 100 is separately configured to provide adequate space for the power adapter connector for the laptop computer. In FIG. 1A it can be seen that one end piece 140 includes a recessed region 160 where the power adapter connector for the laptop computer would be situated when connected to the laptop computer.

SUMMARY

The present invention provides systems configured to secure computing devices, for instance, docks configured to secure laptop computers. The computing device is said to be secured when it is held securely by the system so that normal use will not cause the computing device to come free of the system. Secured computing devices may additionally be locked to the systems, in some embodiments. Exemplary systems of the present invention are characterized by a cross-beam between two movable end members. The crossbeam provides registration for the computing device while the end members include male electrical connectors that engage with ports on the computing device. A mechanical linkage attached to the crossbeam connects the crossbeam to the two end members, and the mechanical linkage includes a lever arm to release the computing device from the secured state.

More specifically, the crossbeam defines a longitudinal axis and includes six primary surfaces such that the crossbeam approximates a cylinder with a rectangular cross-section perpendicular to the longitudinal axis, though in various embodiments the several surfaces may depart from simple planes to accommodate both design features and aesthetics, as the drawings illustrate. The term "generally" is used herein to connote that surfaces described as parallel or perpendicular to each other or to an axis, for instance, are not required to be exactingly so, as again the drawings make apparent.

The crossbeam includes a bottom surface and an opposing top surface that is configured to support the computing device. The crossbeam also includes opposing first and second end surfaces generally perpendicular to the longitudinal axis. The crossbeam also includes opposing front and back surfaces. A footprint of the crossbeam is characterized by a width and a height, and in various embodiments a ratio of the width to the height is greater than 2. In various embodiments, two parallel registration posts extend from the top surface, one registration post at each corner where the top surface meets the back surface and one of the end surfaces. The registration posts are shaped so as not to interfere with the movement of a cover portion of the computing device. In some embodiments the bottom surface includes threaded holes configured to engage with a support, such as a support arm.

The end members of the system fit against the end surfaces of the crossbeam and the end members have approximately the same cross-sections as the crossbeam. Thus, the three pieces together, as the system, also approximate a cylinder with a rectangular cross-section perpendicular to the longitudinal axis of the crossbeam, but with the crossbeam recessed between the end members such that the system can accommodate a computing system between the end members.

In various embodiments the first end member is slidably attached to the crossbeam proximate to the first end surface of the crossbeam. The mechanical linkage is attached to the first end member and is configured to translate the first end member parallel to the longitudinal axis between an open position and a closed position. The first end member includes a first electrical connector extending therefrom towards the crossbeam and parallel to the longitudinal axis. Similarly, the second end member is connected to the crossbeam proximate to the second end surface thereof, and the second end member includes a second electrical connector extending therefrom towards the crossbeam and parallel to the longitudinal axis. In various embodiments the second end member is also slidably attached to the crossbeam and the mechanical linkage is further configured to translate the second end member parallel to the longitudinal axis between an open position and a closed position.

In various embodiments the mechanical linkage comprises a first link attached to the first end member, a second link coupled to the first link and attached to the second end member, and the first and second links are constrained to move together, meaning here that neither can move independently of the other, though they move in opposite directions when actuated. In some of these embodiments, the lever arm of the mechanical linkage and the first link are both pivotally joined at a pivot point, such as provided by a pin or a rivet, and a third link is provided to connect the second link to the pivot point.

In various embodiments the first end member includes a receptacle for a power adapter connector, such as configured to conform to a proprietary design, the receptacle extending into the first end member from a back side thereof and in a direction perpendicular to the longitudinal axis. In some of these embodiments the first end member further includes a light pipe situated such that when a power adapter connector is placed within the receptacle, the light pipe is aligned with a power indicator on the power adapter connector.

Various embodiments can also include a locking mechanism that, when locked, is configured to prevent the mechanical linkage from moving. For instance, a Kensington lock can lock the crossbeam to one end member, and since both end members are constrained to move together, neither can move, thereby locking the computing device between the end members. In some of the embodiments that comprise a locking mechanism, the first end member also includes a receptacle for a power adapter connector. In these embodiments, the locking mechanism, when locked, is also effective to lock the power adapter connector to the system.

The present invention also provides methods of using a system of the invention to secure a computing device. In an exemplary embodiment, a method for securing a laptop computer to a dock comprises a step of aligning a laptop computer between two opposing end members of the dock, a step of securing the laptop computer between the end members by pushing the end members towards one another, and a step of locking an end member of the dock to a crossbeam of the dock. In various embodiments the step of aligning the laptop computer includes pushing the laptop computer against registration posts disposed on the crossbeam. The method can further comprise, before pushing the end members towards one another, inserting a power adapter connector into a receptacle located in of one of the two end members. Locking the end member of the dock to the crossbeam optionally includes locking a Kensington lockhead to a Kensington slot fixedly attached to the crossbeam.

DETAILED DESCRIPTION OF THE INVENTION

The present invention provides systems configured to mechanically engage with a computing device such as a laptop computer, though the invention is not particularly limited to use with laptop computers and can be employed with tablets and smartphones, for example. An exemplary such system comprises a dock that can secure a laptop computer and provide connections therethrough, such as to power and to peripheral devices. The systems of the present invention provide a form factor suited for portability, and provide for convenient engagement and disengagement of the computing device. Embodiments of the invention also allow the computing device to be locked to the system and optionally can also lock an end of the power adapter cord so that the power adapter cannot be disengaged from the computing device. Other advantages are noted below in connection with specific embodiments.

Figure 1A:
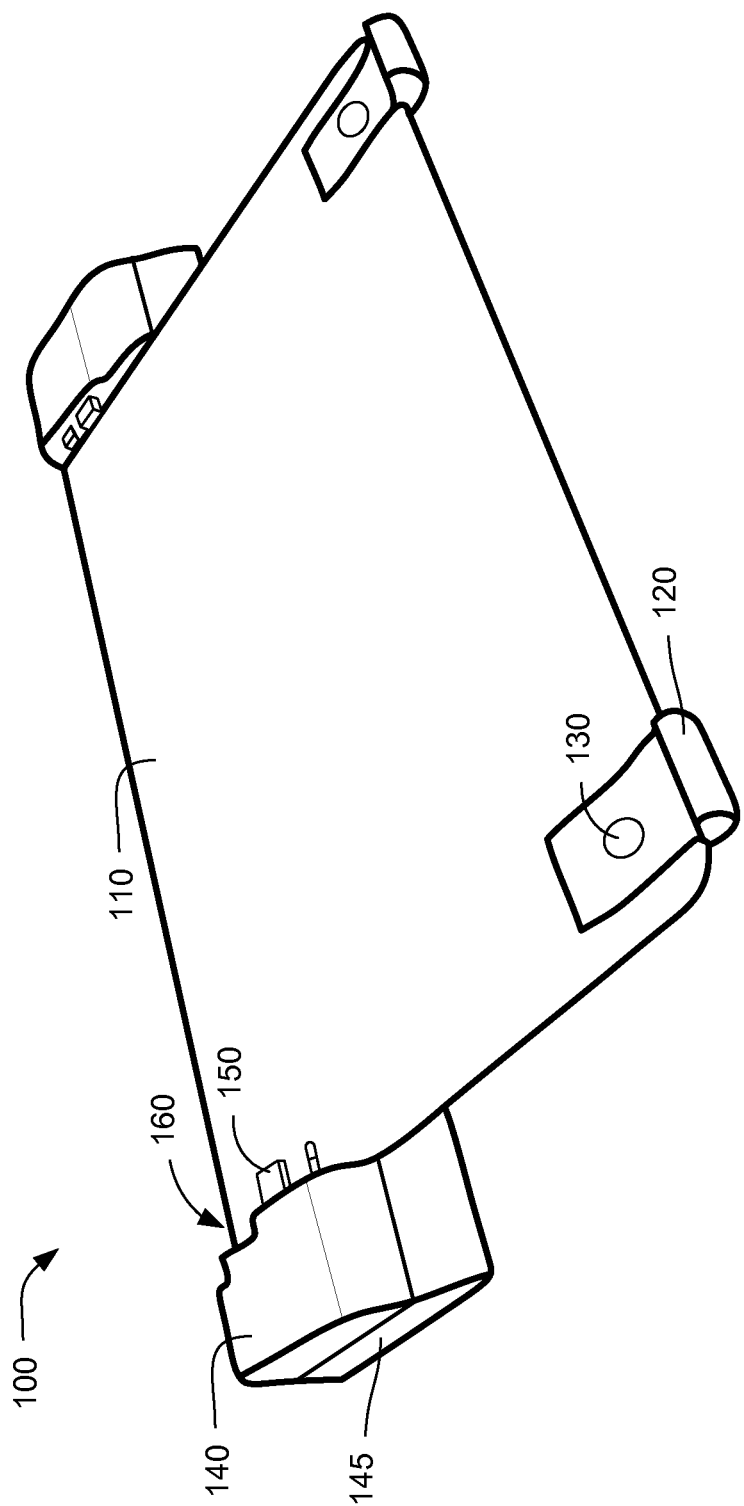
FIGS. 1A and 1B show perspective and bottom views, respectively, of a dock according to the prior art.
Figure 1B:
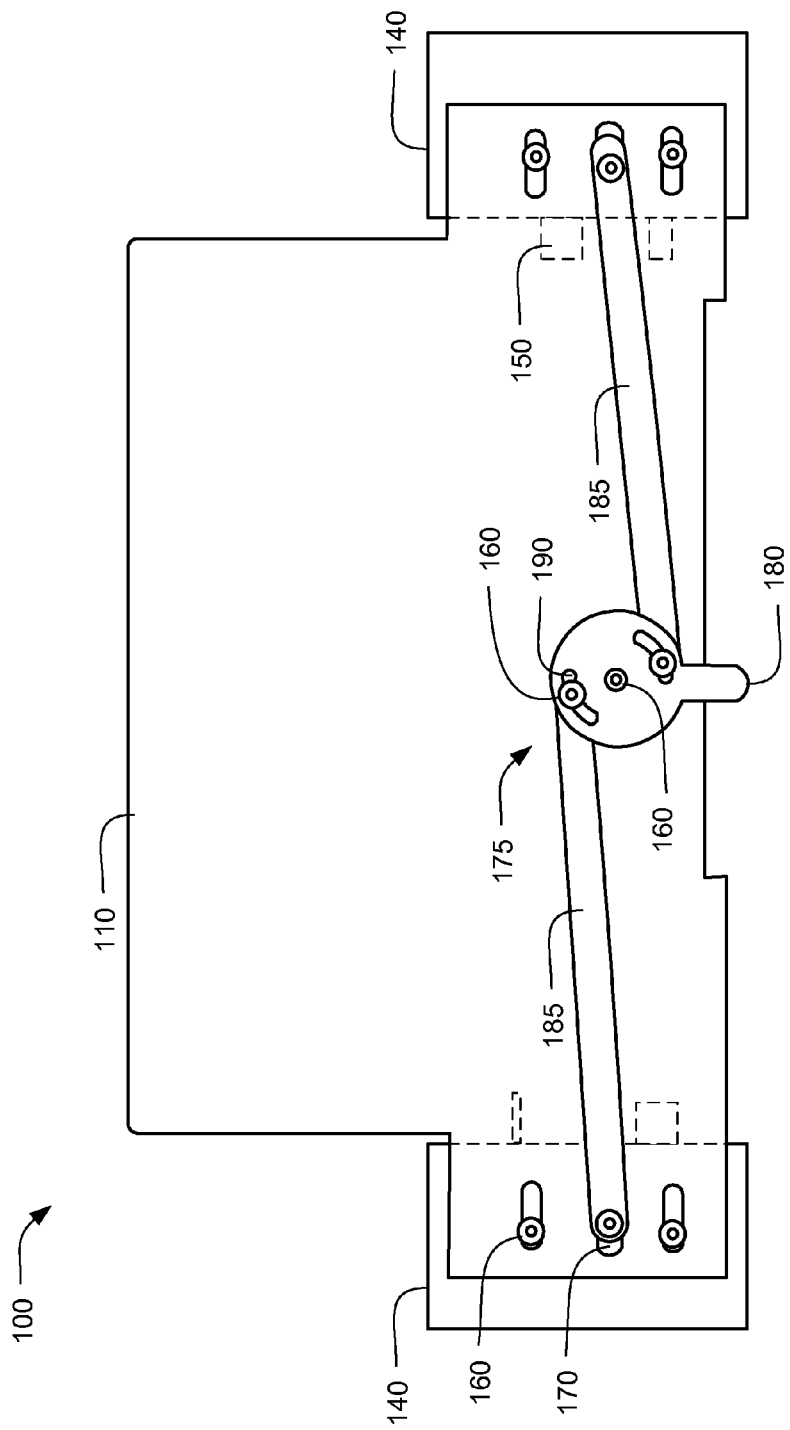
Figure 2:
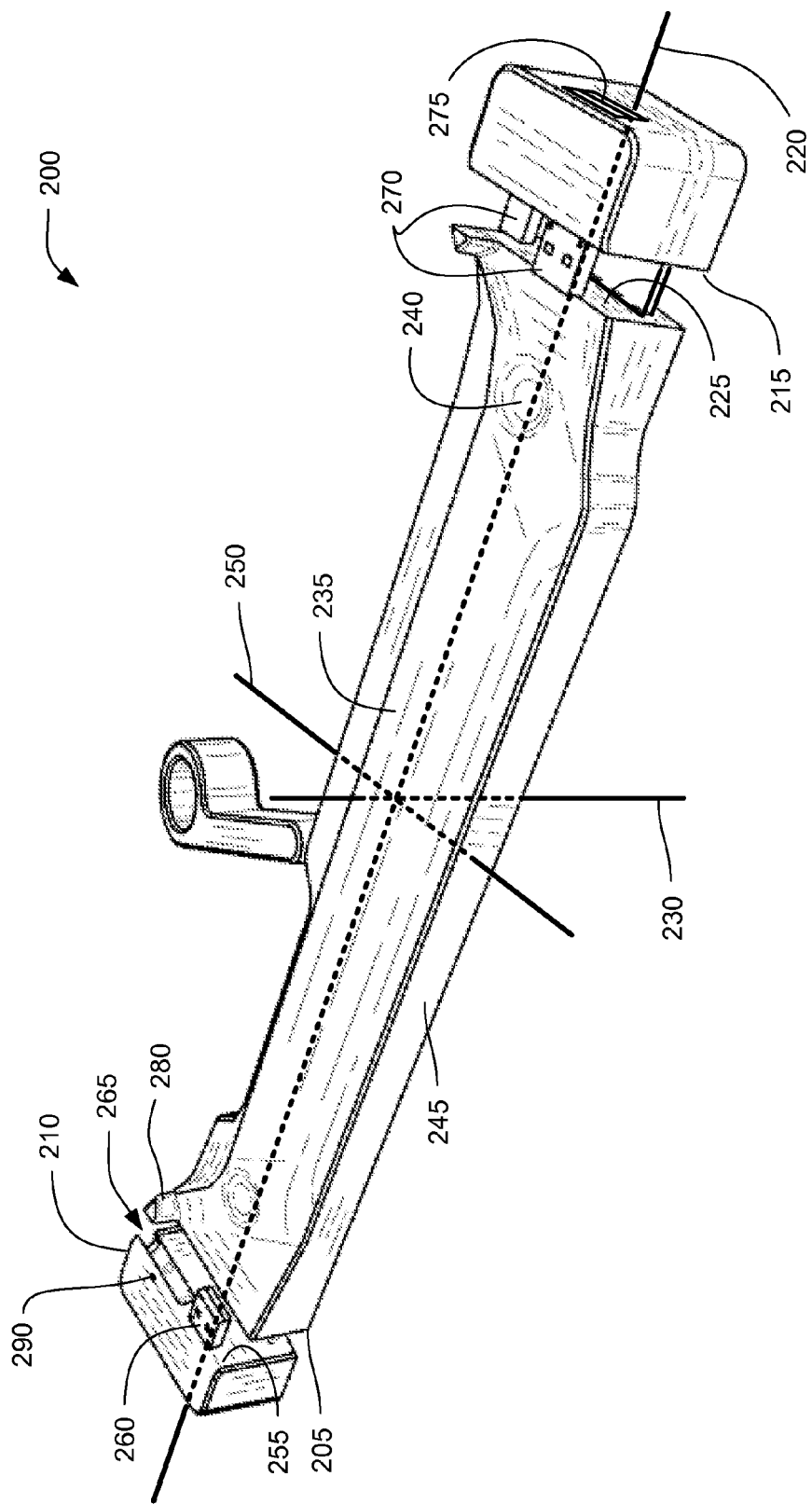
FIG. 2 is perspective view of a system according to an exemplary embodiment of the present invention.
Figure 6:
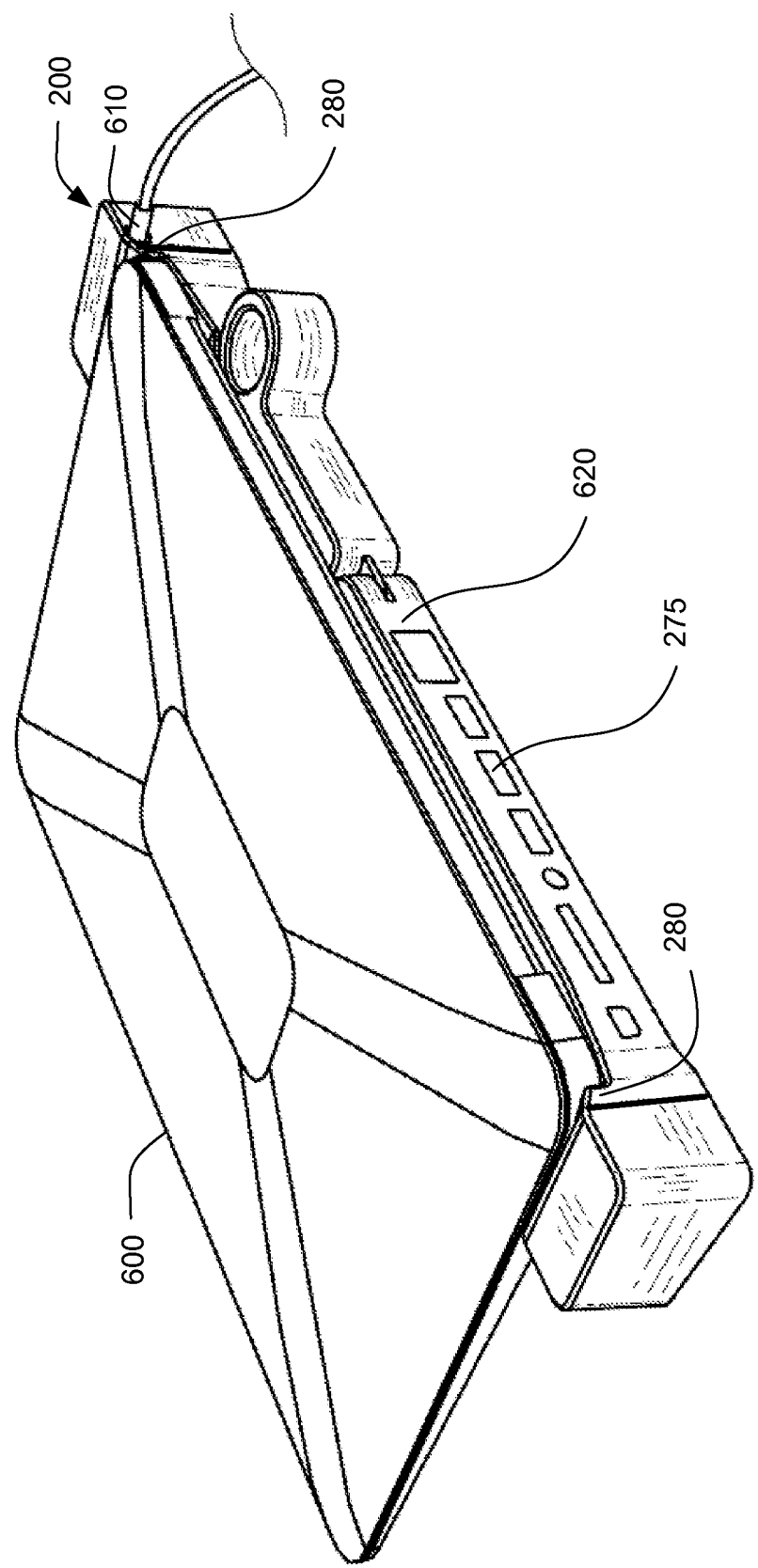
FIGS. 6 and 7 show perspective views of the exemplary embodiment of FIG. 2 securing a laptop computer and a power adapter with the laptop computer screen respectively closed and open.
Figure 7:
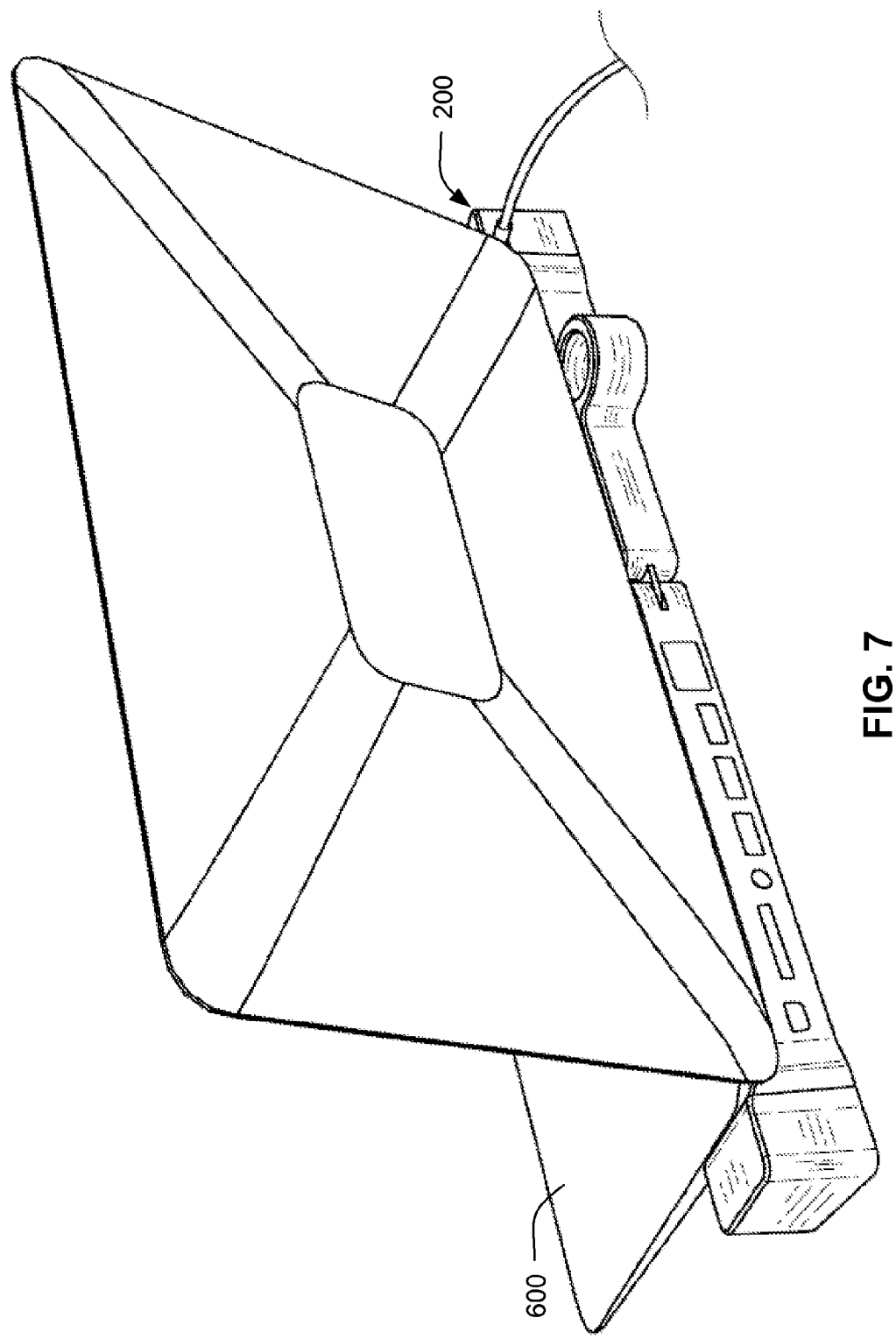
Figure 8:
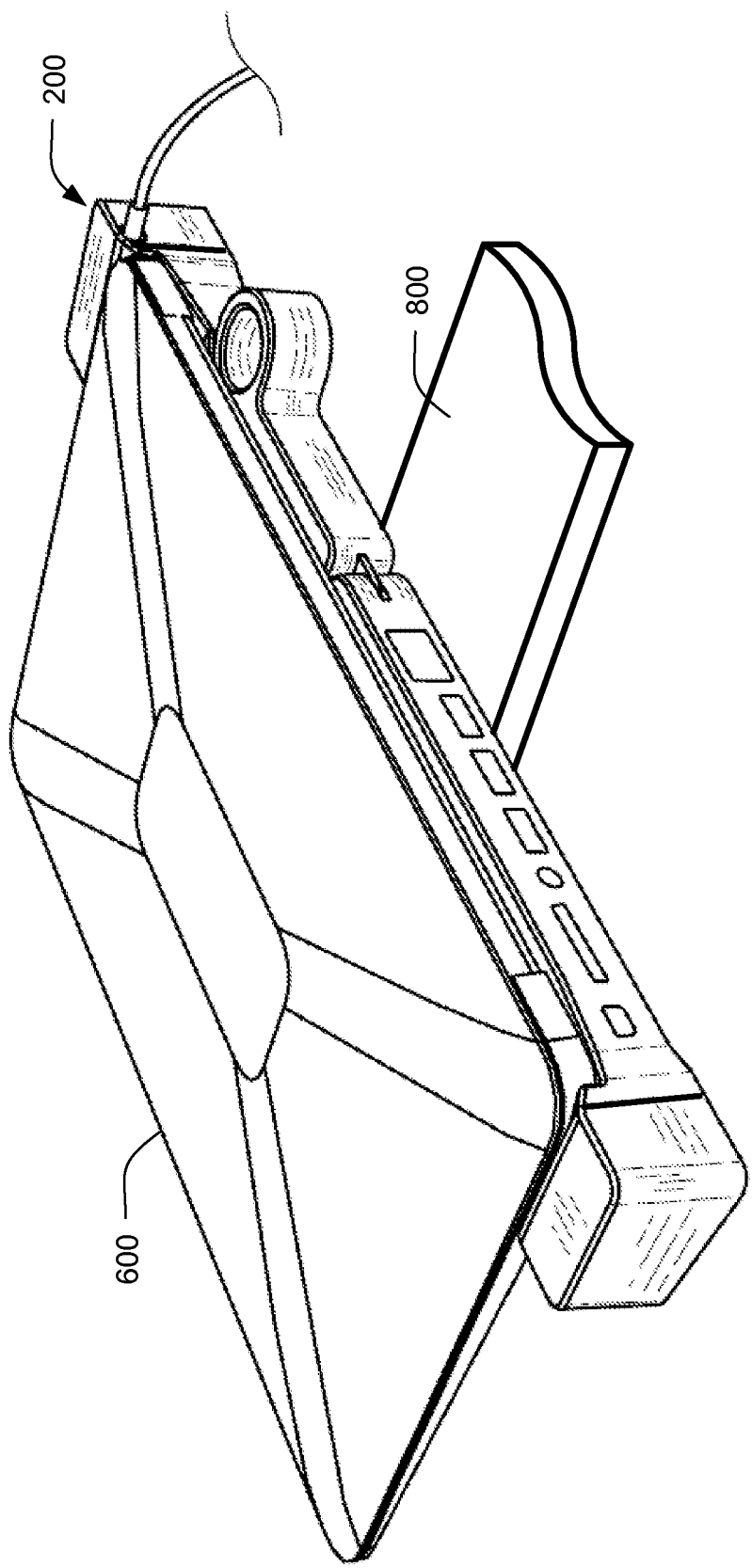
FIG. 8 shows the same view as in FIG. 6 but additionally illustrating a support arm configured to attach to the underside of the system.

FIG. 2 illustrates an exemplary system 200 of the invention that is configured to engage to a mobile or portable computing device, in this instance a laptop computer (not shown in FIG. 2; see laptop computer 600 in FIGS. 6-8). The system 200 comprises a crossbeam 205 connected to a first end member 210 and to a second end member 215. The crossbeam 205 defines a longitudinal axis 220 that intersects the first end member 210 and the second end member 215. The crossbeam 205 includes a first end surface 225 and an opposing second end surface (hidden in FIG. 2) each generally perpendicular to the longitudinal axis 220. The crossbeam 205 also includes a bottom surface (hidden in FIG. 2) configured to support the system 200 when placed on a flat surface such as a table top and can include feet for this purpose. The bottom surface is generally perpendicular to a vertical axis 230 that is itself perpendicular to the longitudinal axis 220.

A top surface 235 of the crossbeam 205 is configured to support the computing device when secured by the system 200. The top surface 235 is generally parallel to the longitudinal axis 220 but can be shaped to generally conform to the underside of the computing device, and optionally includes recesses 240 for receiving feet of the computing device.

Generally perpendicular to the first and second end surfaces are a front surface 245 and an opposing back surface (hidden in FIG. 2; see surface 620 FIGS. 6-8), both generally perpendicular to a transverse axis 250 that is perpendicular to both axes 220, 230. The top surface 235 includes a forward portion that is inclined relative to the bottom surface such that a distance between the top surface 235 and the bottom surface, measured parallel to the vertical axis 230, increases with distance from the front surface 245. In some embodiments, the inclination of the top surface 235 changes to create an open area beneath the computing device for better ventilation. FIG. 2 shows such an angled cutout separated by a ridgeline from the inclined forward portion of the top surface 235. The crossbeam 205 also houses a mechanical linkage, discussed in greater detail below with respect to FIG. 4, that is configured to translate one or both of the first and second end members 210, 215 parallel to the longitudinal axis 220.

Figure 4:
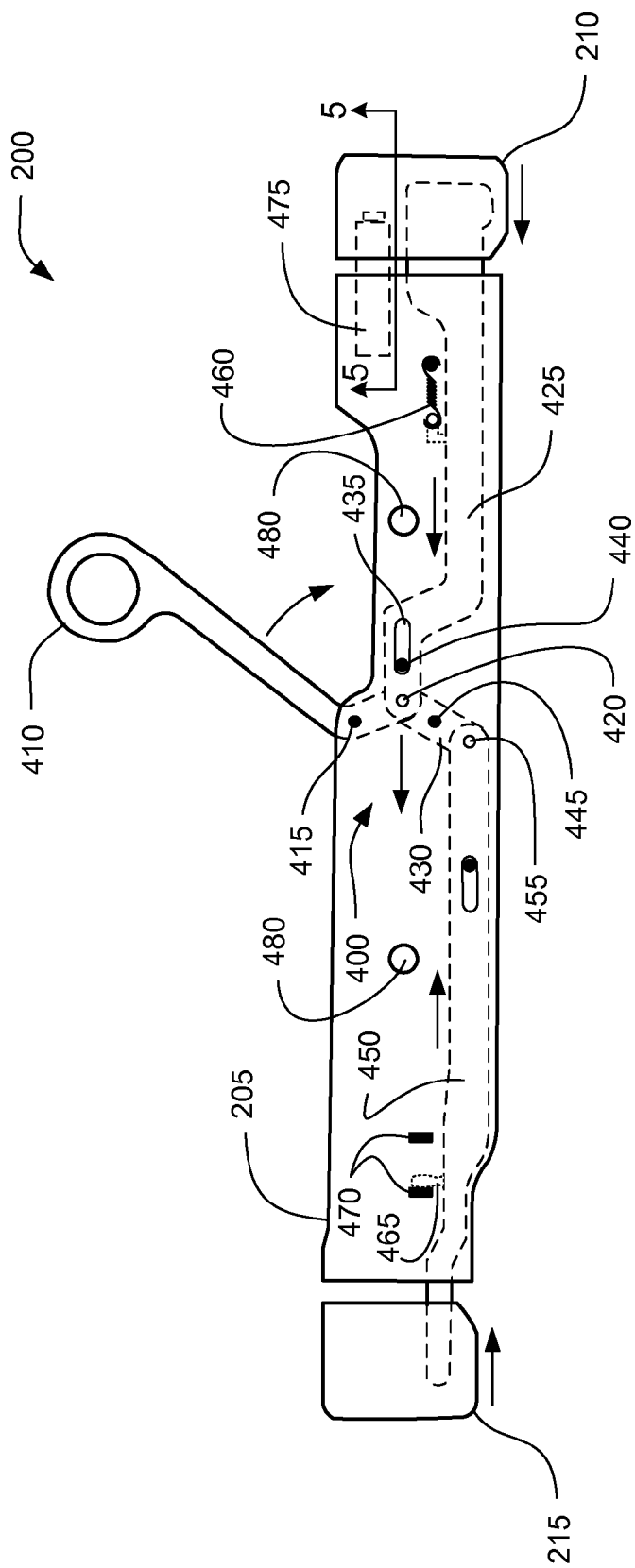
FIG. 4 is a bottom view of the exemplary embodiment of FIG. 2 particularly illustrating an exemplary mechanical linkage and exemplary locking mechanism.

The present invention employs a crossbeam 205, instead of a plate 100 as in the prior art, to make the system 200 more compact and therefore easier to both grasp in one hand and to transport. In some embodiments the crossbeam has a footprint characterized by a width and a height and a ratio of the two. As used herein, a footprint is the surface area covered by the crossbeam 205 when the system rests on a flat surface such as a table. FIG. 4, discussed in greater detail below, illustrates the underside of the system 200, and the footprint of the crossbeam 205 can be seen to be the outline of the crossbeam 205 in this view. The width of the footprint is defined as the distance between the end surfaces measured parallel to the longitudinal axis 220, while the height of the footprint is defined as the maximum distance between the front and back surfaces measured parallel to the transverse axis 250. In some embodiments, a ratio of the width to the height is greater than 2, and more preferably greater than 3.

The first end member 210 includes a surface 255 that is generally perpendicular to the longitudinal axis 220, and further includes a first electrical connector 260 extending from the surface 255 towards the crossbeam 205 and parallel to the longitudinal axis 220. The first end member 210 is slidably connected by the mechanical linkage (see FIG. 4) to the crossbeam 205 such that the mechanical linkage is able to translate the first end member 210 in a direction that is parallel to the longitudinal axis 220. When the first end member 210 is in an extended (open) position, the first end member 210 is a maximum distance from the crossbeam 205 so that the system 200 can receive a computing device between the end members 210, 215. When the computing device is placed on the top surface 235 and properly aligned, the first end member 210 can be moved from the open position towards the crossbeam 205 to a closed position wherein the first end member 210 abuts the crossbeam 205 and the first electrical connector 260 engages with a corresponding female connector of the computing device.

The first end member 210 optionally includes additional electrical connectors 260 extending from the surface 255 towards the crossbeam 205 and parallel to the longitudinal axis 220. Depending on the configuration of the computing system for which the system 200 is intended, additional electrical connectors 260 can be the same or different than the first electrical connector 260. The first electrical connector 260, and any others, can comprise any of a male connector for a power port, a USB port, a mini DisplayPort, an HDMI port, an Ethernet port, a Thunderbolt port, a VGA port, an SD Card slot, an IEEE1394 (FireWire) port, a microphone jack, a headphone jack, a modem port, a PC Card slot, and an Express Card slot, but is not limited to just this list. It is also noted electrical connector 260 is not necessarily an electrically functional connector, and could simply be in the form of a male connector. Further still, while the invention has been illustrated in terms of male electrical connectors that are configured to engage corresponding female connectors, in place of the electrical connector 260 can be a connector configured to engage with any adequate opening in the housing of the computing device, such as a recessed hole for an assembly screw, or an opening for receiving optical media.

The first end member 210 optionally includes a receptacle 265 extending into the body of the first end member 210 in a direction parallel to the transverse axis 250 from a back side (hidden in FIG. 2) of the first end member 210. The receptacle 265 is configured to receive a power adapter connector for the computing system, and in order to permit contact between the power adapter connector and the computing system when properly situated, the receptacle 265 intersects the surface 255 to form an opening therethrough (see also FIG. 5). When the first end member 210 is in the closed position, the power adapter connector is secured by the first end member 210 against the crossbeam 205 such that the power adapter connector cannot be removed, advantageously preventing accidental disconnection or theft of the power adapter.

The second end member 215 also includes a surface (hidden in FIG. 2) that is generally perpendicular to the longitudinal axis 220, and further includes a second electrical connector 270 extending from the surface towards the crossbeam 205 and parallel to the longitudinal axis 220. The second end member 215 is optionally also slidably connected by the mechanical linkage to the crossbeam 205 such that the mechanical linkage is able to translate the second end member 215 in a direction that is parallel to the longitudinal axis 220. In other embodiments the second end member 215 is fixedly attached to the crossbeam 205 rather than movable.

In those embodiments in which the second end member 215 is translatable, the second end member 215 can be translated by the mechanical linkage between an extended position, and a closed position, analogous to the range of motion of the first end member 210. The second end member 215 optionally includes additional electrical connectors 270 extending from the surface towards the crossbeam 205 and parallel to the longitudinal axis 220 (a second such connector 270 is shown in FIG. 2). Depending on the configuration of the computing system for which the system 200 is intended, additional electrical connectors 270 can be the same or different and can comprise any of the examples listed for the first electrical connector 260.

Since the electrical connectors 260, 270 are configured to engage with respective female electrical connectors of the computing device, the system 200 also includes outward-facing female electrical connectors 275 in electrical communication with the electrical connectors 260, 270 so that a peripheral device can be attached to the system 200 to communicate with the computing device through one of the electrical connectors 260, 270. An example of an outward-facing female electrical connector 275 is shown disposed on second end member 215 but can also be in disposed on the first end member 210 and on the crossbeam 205 (see FIGS. 6-8). Electrical communication between female electrical connectors 275 disposed on the crossbeam 205 and electrical connectors 260, 270 can be achieved through conductors (not shown) between the crossbeam 205 and the end members 210, 215. In some embodiments the conductors comprise metal traces on a flexible substrate, such as Kapton, sometimes referred to as flexible printed circuits. There can be a 1:1 correspondence of female electrical connectors 275 to male electrical connectors 260, 270, while in some embodiments multiple female electrical connectors 275 connect to one male electrical connector 260 or 270 through hub, switching circuitry, or splitting circuitry.

In various embodiments the crossbeam 205 includes registration posts 280 extending generally parallel to the vertical axis 250 from back corners of the top surface 235. To dock a computing device in these embodiments, the user pushes the computing device up against the registration posts 280 and then closes the system 200, for example, by pushing the end members 210, 215 towards each other. The registration posts 280 are shaped such that they do not interfere with the movement of a cover portion of the computing device, such as the screen of a laptop computer (see FIGS. 6 and 7).

Figure 3:
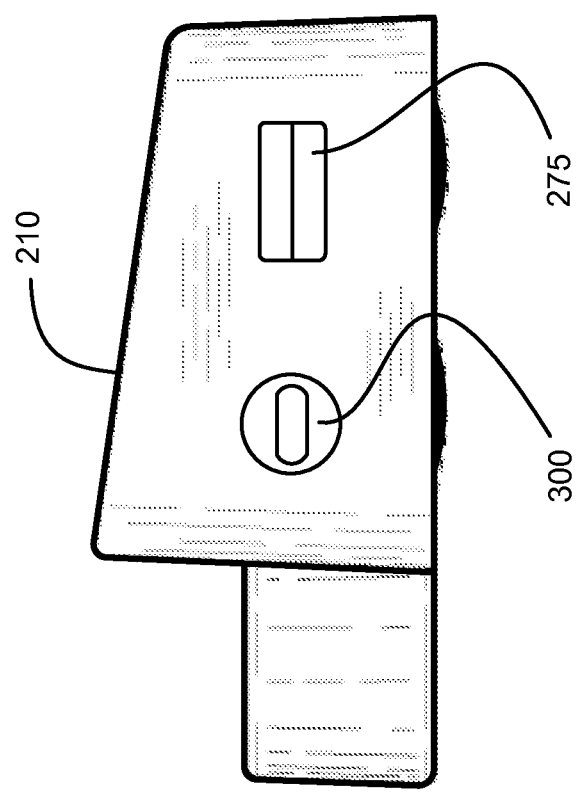
FIG. 3 is an end view of the exemplary embodiment of FIG. 2.

In various embodiments either the first end member 210 or the second end member 215 includes a locking mechanism such as a Kensington lock. FIG. 3 illustrates a side view of the system 200 showing an embodiment of the first end member 210 where the first end member 210 includes an outward-facing female electrical connector 275 and a slot 300 for a Kensington lock. When the system 200 is in a closed configuration a Kensington lockhead (not shown) can be engaged with the Kensington slot 300 to lock the computing device to the system 200 and to a structure such as a table or wall. This exemplary locking mechanism is discussed further below with respect to FIGS. 4 and 5.

FIG. 4 shows an underside view of the system 200 to illustrate an exemplary mechanical linkage 400 configured to translate the first and second end members 210, 215 parallel to the longitudinal axis 220. Mechanical linkage 400 is represented with dashed lines where the mechanical linkage 400 resides within the crossbeam 205 or within the first and second end members 210, 215. Mechanical linkage 400 includes a lever arm 410 configured to rotate around a fixed pivot point provided in this example by a pin 415 affixed to the crossbeam 205. One side of the lever arm 410 extends from the pin 415 through an opening in the housing of the crossbeam 205 and is configured to be readily grasped, for example by a loop at the end, as shown. The other end of the lever arm 410, opposite the pin 415 from the first end, is rotatably connected within the crossbeam 205 by another pin 420 to two other links of the mechanical linkage 400, a first link 425 and a second link 430. Pins such as pin 415 that are fixed relative to the housing of the crossbeam 205 are shown in FIG. 4 as filled circles while pins such as pin 420 that are not fixed to the housing are shown as open circles. Pins that move during the actuation of the mechanical linkage 400, such as pin 420, may be constrained to move within a guide defined within the interior of the housing, but such detail has been omitted for clarity.

One end of the first link 425 is rotatably connected to pin 420 while the opposite end of the first link 425 is connected to the first end member 210 such that the first link 425 and first end member 210 move together. The first link 425 includes a groove 435 defined therethrough. The groove 435 has a major axis aligned parallel to the longitudinal axis 220 and is disposed around a fixed pin 440. Thus, the first link 425 is constrained by the groove 435 around the pin 440 to move in a direction parallel to the longitudinal axis 220. It can be seen from FIG. 4 that rotating the lever arm 410 will translate the first link 425 and the first end member 210, and moving the first end member 210 will similarly rotate the lever arm 410 around the pivot point at pin 415.

The second link 430 is configured to rotate about another pivot point provided in this example by fixed pin 445. One end of the second link 430 is attached to the pin 420 while the opposite end of the second link 430 is attached to a third link 450 by a pin 455 that also has a constrained range of movement within the housing of the crossbeam 205. The third link 450 is connected to the second end member 215 such that the third link 450 and second end member 215 move together. Analogous to the first link 425, the third link 450 also includes a groove defined therethrough having a major axis aligned parallel to the longitudinal axis 220 and disposed around a fixed pin. Thus, the third link 450 is also constrained to move in a direction parallel to the longitudinal axis 220. It can also be seen from FIG. 4 that rotating the lever arm 410 will rotate the second link 430 which will translate the third link 450 and the second end member 215, but in the direction antiparallel to the direction of motion of the first link 425 and first end member 210. Likewise, moving the second end member 215 will rotate the lever arm 410. In various embodiments either or both of the first and third links 425, 450 can employ two or more of the groove and pin combinations described above, each such extra groove also aligned with the longitudinal axis 220.

In operation, a computing device is placed on the top surface 235 (FIG. 2) while the system 200 is in the open configuration (as illustrated by FIG. 4), then the user pushes the end members 210, 215 towards one another to engage the electrical connectors 260, 270 with the respective female connectors of the computing device, also causing the lever arm 410 to rotate down towards the crossbeam 205. When fully engaged, the system 200 is in the closed configuration and the lever arm 410 rests proximate to the back surface of the crossbeam 205. In some embodiments the crossbeam 205 includes a recess along the back surface (as illustrated by FIG. 4) such that the lever arm 410 is received by the recess when the system 200 is in the closed configuration (see also FIGS. 6-8). In some embodiments the lever arm 410 is secure when the system 200 is in the closed configuration, meaning there is some level of resistance to moving such that a modest level of force must be applied to the lever arm 410 in order to overcome the resistance and move the mechanical linkage 400 to decouple the computing device from the system 200. The resistance can be provided by a detent and a matching protrusion or pin configured to engage the detent, for example. As another example, the both the lever arm 410 and the back surface of the crossbeam 205 can be provided with permanent magnets that are brought together when the system 200 is in the closed configuration. A magnetic material such as some steels can substitute for one of the permanent magnets in this arrangement.

In various embodiments the mechanical linkage 400 includes a spring 460 attached at one end to a fixed pin and attached at the other end, for example, to a link such as the first link 425. The spring 460 is configured to be tensioned when the system 200 is in the closed configuration in order to help transition the system 200 to the open configuration by forcing the end members 210, 215 away from the crossbeam 205 when the mechanical linkage 400 is released. A further advantage of the spring 460 is that when the system 200 is in the open configuration the spring 460 serves to keep system 200 in that configuration, ready to accept a computing system.

In various embodiments the mechanical linkage 400 is configured to dampen the action of the mechanical linkage 400 at one or both ends of the range of motion. For example, as shown in FIG. 4, the third link 450 can include a finger 465 that is configured to move between two limiting bumpers 470 that are fixedly attached to the housing of the crossbeam 205 and made of a resilient material.

The foregoing example illustrated by mechanical linkage 400 is but one way to implement the actuation described above. Another linear actuator that can constrain the first and second end members 210, 215 to move parallel to an axis either towards or away from one another is a rack and pinion. Additionally, the illustrated shapes of the links 425 and 450 in particular are merely exemplary, and illustrate merely one way to accommodate other components within the housing of the crossbeam 205, like circuit boards and wiring to the various ports. The pin and groove method for constraining the motions of the links 425, 450 is also merely exemplary as such constraint can be achieved in numerous other ways.

Figure 5:
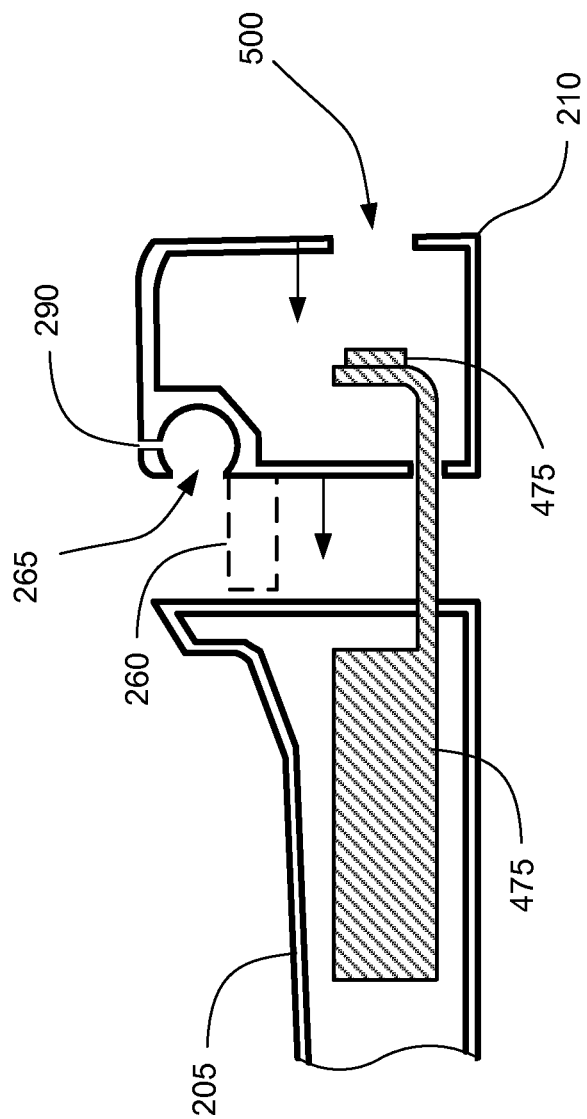
FIG. 5 is a cross-sectional view indicated in FIG. 4 to illustrate the operation of the locking mechanism.

As noted above, some embodiments of the system 200 are configured to be locked to the computing device so that, for example, a key or combination must be used to separate them. Kensington locks, such as the ClickSafe model, are examples of locking mechanisms that can be employed in the system 200. FIG. 3 shows a Kensington slot 300 in the first end member 210. FIG. 4 shows the portion 475 of the lock mechanism that is fixedly disposed within the crossbeam 205 while FIG. 5 shows a cross-sectional view of the indicated section of FIG. 4. As can be seen in FIG. 5, the portion 475 of the lock mechanism is attached to, and extends from, the crossbeam 205 and into the first end member 210, but is not attached to the first end member 210, unlike the first link 425 (FIG. 4). The portion 475 includes the slot 300 (FIG. 3) facing an aperture 500 in the housing of the first end member 210. When the system 200 is in the open configuration, as illustrated in FIG. 5, the slot 300 is recessed from the aperture 500, as shown. When the system 200 is moved to the closed configuration, the aperture 500 aligns with the slot 300 so that a face of the slot 300 is flush with the housing of the first end member 210, as illustrated in FIG. 3. In this configuration a user can attach a Kensington lockhead to the slot 300. Once locked in this way, the mechanical linkage 400 prevents the end members 210, 215 from moving apart, locking the computing device between the end members 210, 215.

It will be appreciated that the user can also insert a power adapter connector into the receptacle 265 while the system 200 is in the open configuration. When the system 200 is moved to the closed configuration around the computing device, the power adapter connector will also engage with the computing device. Further, if a locking mechanism such as the Kensington lock is employed, then the power adapter cord is also secured to the assembly.

Another optional feature that can increase the security of the system 200, when locked to a computing device is to locate fasteners, that hold together the housing of the crossbeam 205, where the fasteners cannot be accessed when the computing device is locked to the system 200. For example, a fastener, such as a screw, can be located such that it is accessed from the top surface 235. In various embodiments the top surface 235 includes a countersink or counterbore to receive each such fastener, and in further embodiments the heads of the fasteners are masked by one or more labels.

Returning to FIG. 2, some embodiments include a light pipe 290 disposed within the first end member 210 and situated such that when a power adapter connector is placed within the receptacle 265, the light pipe 290 is aligned with a power indicator on the power adapter connector. FIG. 5 also shows the light pipe 290. When the power indicator is lit, the user can see the power indicator via the light pipe 290 even though the power adapter connector is itself hidden from view. Another indicator (not shown), such as an LED and disposed on the second end member 215, for instance, can utilize power from a USB port, or another port that provides DC power, to indicate whether the computing device is in a powered mode or sleep mode, or completely powered off.

FIGS. 6 and 7 show perspective views of the system 200 securing a laptop computer 600 and a power adapter connector 610 with the laptop computer screen respectively in closed and open positions. If locked in this configuration by a locking mechanism, the mechanical linkage 400 and the end members 210, 215 cannot be moved. Thus, one key is sufficient to lock both the computing device 600 and the power adaptor connector 610 to the system 200. It can be seen from FIGS. 6 and 7 that the registration posts 280 are configured to restrain the laptop computer 600 without interfering with the movement of the screen (FIG. 7).

FIGS. 6 and 7 also show a back surface 620 of the crossbeam 205 to illustrate an exemplary arrangement of various female electrical connectors 275. These connectors 275 can include, for example, any or all of a VGA output port for an external monitor, an Ethernet port, a FireWire port, a mini DisplayPort, a Thunderbolt port, a port to receive a flash memory card (e.g., SD Card, Memory stick, or xD card), and a USB hub, as well as others.

Returning to FIG. 4, the underside of the crossbeam 205 can optionally include threaded screw holes 480. The screw holes 480 can be used, for example, to engage additional hardware such as a support arm 800, a portion of which is shown in FIG. 8. The support arm 800 can be used to mount the system 200 to a wall, for instance. It will be appreciated that the support arm 800 is merely illustrative of other supports and supporting hardware to which the system 200 can be attached using the screw holes 480.

Various embodiments may further comprise additional optional features disposed within the crossbeam 205 as either a permanent component or as a detachable component, such as a module. Modules can comprise very slim form factors, and in some embodiments, a module is secured within the system by the same act of engaging the locking mechanism described above. Such additional optional features can include, for example, feet or legs disposed on the bottom surface of the crossbeam 205 to provide a better viewing and/or typing angle for the computing device and/or to provide open space beneath the computing device for ventilation. In some instances the legs or feet are adjustable or retractable. A permanent or modular cooling fan can be provided within the housing of the crossbeam 205 or can be externally attached to the rear or bottom surfaces thereof. Other examples of optional components that can be permanent or modular include a wireless data modem (3G or 4G), a Global Positioning System (GPS) receiver, internal memory (random access), and a battery.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive. It will be recognized that the terms "comprising," "including," and "having," as used herein, are specifically intended to be read as open-ended terms of art.

What is claimed is:

1. A system configured to secure a computing device, the system comprising:
   a crossbeam defining a longitudinal axis and including
      a bottom surface,
      a top surface configured to support the computing device, and
      opposing first and second end surfaces generally perpendicular to the longitudinal axis;
   a mechanical linkage attached to the crossbeam, the mechanical linkage comprising a first link attached to the first end member, a second link coupled to the first link and attached to the second end member, the first and second links being constrained to move together, the mechanical linkage further comprising a lever arm, the lever arm and the first link being pivotally joined at a pivot point, and the mechanical linkage further comprising a third link connecting the second link to the pivot point;
   a first end member slidably attached to the crossbeam proximate to the first end surface thereof, the mechanical linkage being attached to the first end member and configured to translate the first end member parallel to the longitudinal axis between an open position and a closed position, the first end member also including a first electrical connector extending therefrom towards the crossbeam and parallel to the longitudinal axis; and
   a second end member connected to the crossbeam proximate to the second end surface thereof, the second end member including a second electrical connector extending therefrom towards the crossbeam and parallel to the longitudinal axis.

2. The system of claim 1 wherein a footprint of the crossbeam is characterized by a width and a height and wherein a ratio of the width to the height is greater than 2.

3. The system of claim 1 wherein the second end member is slidably attached to the crossbeam and wherein the mechanical linkage is further configured to translate the second end member parallel to the longitudinal axis between an open position and a closed position.

4. A system configured to secure a computing device, the system comprising:
   a crossbeam defining a longitudinal axis and including
   a bottom surface,
   a top surface configured to support the computing device, and
   opposing first and second end surfaces generally perpendicular to the longitudinal axis;
   a mechanical linkage attached to the crossbeam;
   a first end member slidably attached to the crossbeam proximate to the first end surface thereof, the mechanical linkage being attached to the first end member and configured to translate the first end member parallel to the longitudinal axis between an open position and a closed position, the first end member also including a first electrical connector extending therefrom towards the crossbeam and parallel to the longitudinal axis, the first end member further including a receptacle for a power adapter connector, the receptacle extending into the first end member from a back side thereof and in a direction perpendicular to the longitudinal axis, and the first end member further still including a light pipe situated such that when a power adapter connector is placed within the receptacle, the light pipe is aligned with a power indicator on the power adapter connector; and
   a second end member connected to the crossbeam proximate to the second end surface thereof, the second end member including a second electrical connector extending therefrom towards the crossbeam and parallel to the longitudinal axis.

5. The system of claim 1 further comprising a pair of parallel registration posts extending from the top surface and shaped so as not to interfere with the movement of a cover portion of the computing device.

6. The system of claim 1 further comprising a locking mechanism that, when locked, is configured to prevent the mechanical linkage from moving.

7. The system of claim 6 wherein the first end member includes a receptacle for a power adapter connector, wherein the locking mechanism, when locked, is effective to lock the power adapter connector to the system.

8. The system of claim 1 wherein the bottom surface includes threaded holes configured to engage with a support.

9. The system of claim 4 wherein a footprint of the crossbeam is characterized by a width and a height and wherein a ratio of the width to the height is greater than 2.

10. The system of claim 4 wherein the second end member is slidably attached to the crossbeam and wherein the mechanical linkage is further configured to translate the second end member parallel to the longitudinal axis between an open position and a closed position.

11. The system of claim 4 further comprising a pair of parallel registration posts extending from the top surface and shaped so as not to interfere with the movement of a cover portion of the computing device.

12. The system of claim 4 further comprising a locking mechanism that, when locked, is configured to prevent the mechanical linkage from moving.

13. The system of claim 12 wherein the first end member includes a receptacle for a power adapter connector, wherein the locking mechanism, when locked, is effective to lock the power adapter connector to the system.

14. The system of claim 4 wherein the bottom surface includes threaded holes configured to engage with a support.

* * * * *